Patented June 13, 1939

2,161,805

UNITED STATES PATENT OFFICE 2,161,805

TREATMENT OF TEXTILES AND OTHER MATERIALS

Henry Dreyfus, London, Donald Finlayson and Richard Gilbert Perry, Spondon, near Derby, England, assignors to Celanese Corporation of America, a corporation of Delaware No Drawing. Application November 15, 1937, Serial No. 174,714. In Great Britain November 16, 1936

15 Claims. (Cl. 91—70)

This invention relates to the treatment of textile and other materials, for example yarns, fabrics, ribbons, films and like materials, having a basis of organic derivatives of cellulose, and has as its principal object to provide a means of increasing the resiliency of such materials.

Attempts to increase the resiliency of materials of the kind referred to above by forming synthetic resins in the materials have hitherto proved unsucessful in spite of researches extending over many years directed to this end. We have now found a method whereby the resiliency of such materials can be increased to a substantial extent so that, for example, the resistance of fabrics having a basis of organic derivative of cellulose to creasing can be greatly increased while at the same time other valuable properties can be imparted to the materials, for example, their dye affinities can be modified.

According to the present invention the resiliency of filaments, yarns, fabrics, films and like materials having a basis of organic derivative of cellulose is increased by causing the material to absorb from non-aqueous solution in a liquid having a swelling action on the material, matter capable of condensation or polymerisation under the influence of heat to form a water-insoluble synthetic resin in the material, and heating the material to effect said condensation or polymerisation.

The resin-forming matter absorbed by the material may comprise a mixture of two or more resin components, i. e. simple substances of well-defined chemical and physical properties such, for example, as formaldehyde and urea, which react to form condensation products capable of conversion on heating into water-insoluble elastic resins. On the other hand, the resin-forming matter may comprise an intermediate condensation product or polymerisation product of such resin components. Such intermediate product must be of very considerably lower molecular weight than the synthetic resin which is to be formed from it by the heat treatment. Although water-solubility is not an essential characteristic of such intermediate product for the purpose of the invention since the intermediate product is applied in non-aqueous solution, water-solubility forms a useful criterion of the degree of condensation which is permissible in the intermediate product and it may be said that the intermediate products used in the process of the invention, if not actually water-soluble, should not be of substantially greater molecular weight than the most complex water-soluble products obtainable by condensation or polymerisation of the resin components. Naturally, the synthetic resin formed in the materials must itself have some degree of resiliency. Thus, it will be understood that the formation of very highly condensed infusible brittle products such as the "C" type of phenol-formaldehyde resin is not contemplated. It is not, however, necessary that the resin formed according to the present invention should be as elastic even as some of the resins obtained by polymerisation of unsaturated esters. Particularly valuable results are obtainable by employing urea and formaldehyde, as the resin components in solution in methanol.

The formaldehyde besides entering into the subsequent resin formation has itself a swelling effect on the materials. It may with advantage be present to the extent of about 10–15% of the methanol-formaldehyde mixture. Lower concentrations, e. g., 5–8% or less can be used but are less effective; concentrations greater than about 18% tend to plasticise the materials to an extent which in the case of fabrics is undesirable although it may be useful in the case of materials in which greater rigidity is permissible, e. g. in the treatment of sheet material for the production of articles such as lamp shades.

The urea may be applied before the formaldehyde, in solution in non-aqueous methanol, but it is preferable to apply the urea and formaldehyde together. It is of advantage first to effect a preliminary reaction between the two, controlling the conditions so that the reaction does not proceed too far.

The preliminary reaction may be effected by dissolving the urea in the formaldehyde-methanol mixture, making the solution alkaline, and heating for a few minutes at 60–70° C. The reaction mixture should then be cooled strongly and neutralised or rendered slightly acid. It may then be stored until required. Before use it may be diluted with methanol and further acidified, e. g., with a small quantity of a substantially anhydrous strong acid, e. g., sulphuric, hydrochloric or formic acid. Alternatively, a small quantity of a strong acid may be added to the bath while the solution is being absorbed by the material, which may for this purpose be soaked in the solution for 20 or 30 minutes. The material is then dried and then heated for a few minutes at a temperature above about 120° C. e. g. 180°–200° C. to form the insoluble reaction product.

The alkalinity required for the first stage of the reaction may be obtained by the addition of alcoholic potash or soda or anhydrous ammonia until for example the pH value is about 8. The neutralisation or acidification following the first stage of the reaction may be effected by the addition of acetic anhydride or glacial acetic acid until, for instance, the pH value is between 5 and 6. In the last stage of the reaction, carried out in the material, the pH value may be as low as 3 or even 2. Or the acidity may be considerably less, for example pH 5-4. On the other hand, the final reaction may be effected under alkaline conditions. Thus for example the solution of the intermediate reaction product may be brought to a pH value of 8-9 or even 11 by addition of alcoholic potash or soda towards the end of the application of the solution to the material and the final heating may be carried out under such alkaline conditions.

Very good results have been obtained using the formaldehyde and urea in about equimolecular proportions but these proportions may be varied in both directions. The concentration of the solution in which the intermediate product is applied may also be varied. Thus for example the solution obtained by reacting one part by weight of urea with 3-4 parts by weight of a 10-15% solution of formaldehyde in methanol may be diluted with an equal volume of methanol or with 2 or 3 volumes thereof or with less than 1 volume. Care must be taken, however, that the solution is not so concentrated as to have an undesirable plasticising or solvent action on the materials. The more dilute the solution the longer the soaking of the material must be continued to produce a given degree of resistance to deformation. Dilution with a mixture of formaldehyde and methanol instead of with methanol alone tends to shorten the soaking period but may tend to produce harshness in the product.

Instead of a single, protracted treatment with a relatively dilute solution of the intermediate reaction product, several successive applications of the solution may be resorted to, the material being dried preferably at ordinary temperatures or at least at a temperature below 100° C., e. g., 60° or 70° C. after each application. Other things being equal the absorption appears to take place most quickly when the solution is markedly acid, hence it is of advantage unless the final reaction is to be carried out under alkaline conditions to introduce all the acid required to catalyse this reaction before or in the early stages of the soaking step. Instead of acidifying by means of a small quantity of a strong acid such as sulphuric, hydrochloric or formic acid, a weaker acid, e. g., acetic or oxalic acid may be used in greater amount.

The greater the extent to which water is removed from the materials treated, the more readily is the resiliency of the material increased. For this reason, unless water has been removed from the materials by a previous operation, the evaporation of the solvent in which the resin-forming substance is applied should be carried out so as to remove as much water as possible from the materials without producing premature condensation. It is of advantage to carry out a preliminary treatment adapted to remove water from the materials. This may take the form of a solvent extraction, for example by means of anhydrous alcohol, or of a heating step, followed by immersion of the materials while they are still hot in the non-aqueous liquid which is to effect the swelling.

The condensation or polymerisation is, as indicated above, effected by the application of heat to the materials containing the resin-forming substance or substances. This may be effected by passing the material through a heated atmosphere or over heated rolls. A very convenient apparatus for this purpose is one similar to the agers used in dyeing but provided with means for obtaining a higher temperature than is usually reached in such machines.

It is important to remove or prevent the formation of a coating of the water-insoluble reaction product on the outside of the materials. This may be done in various ways. After the drying step preparatory to the final heating the materials may be subjected to a brushing, beating or other mechanical treatment adapted to remove any of the intermediate reaction product adhering to the outside of the materials, as described in U. S. application S. No. 173,871 filed Nov. 10, 1937, corresponding to British application No. 31362/36. Similar methods may be employed after the final heating; or the materials may be scoured with a mildly alkaline solution adapted to remove the insoluble reaction product from the outside of the materials without penetrating to the interior or damaging the materials.

The following example illustrates the invention:—

*Example*

40 parts by weight of urea and 160 parts by weight of an 11% solution of formaldehyde in methanol are mixed and brought to a pH of about 8 by the addition of caustic potash dissolved in methanol. The resulting solution is heated at 60-70° for a few minutes and then cooled rapidly. Acetic anhydride is added to bring the solution to a pH value of about 5. The solution is then allowed to stand for some hours or until required. Before use the solution is acidified by the addition of 1-2% of concentrated sulphuric acid. The fabric of cellulose acetate artificial silk is immersed in this solution for 20-30 minutes after which it is removed and dried in air at ordinary temperature. It is then heated at 180-200° C. for about 5 minutes. Finally any synthetic resin formed on the outside of the fabric is removed by passing it through a fabric breaker.

Although the best results have been obtained by the use of methanol as the principal constituent of the non-aqueous swelling medium, other swelling agents of high penetrative power for the material and capable of dissolving the resin component and intermediate reaction products thereof, may be used. Such agents are characterised by the presence of active groups such as hydroxyl, carbonyl or carboxy groups and by simplicity of structure and high volatility. Examples of suitable agents where the cellulose derivative is cellulose acetate are ethyl acetate, methyl formate, methyl acetate, methylal and ethylal. Naturally the swelling medium must not be a true solvent for the materials. Liquids which are true solvents such as ethyl acetate, methyl acetate and methyl formate must therefore, be employed in the swelling medium in conjunction with suitable non-aqueous diluents, e. g., ether or benzene. In using such diluents, however, due regard must be had to the possibility of unduly decreasing the penetrative power of the medium and/or its solvent power for the intermediate reaction product. Instead of formaldehyde other active aldehydes can be used, e. g., acetaldehyde, furfural and acrolein. We prefer to employ resin components and swelling agents containing not more than two carbon atoms.

In place of urea other substances capable of reacting with the aldehyde under suitable conditions can be used, e. g. thiourea, dicyandiamide, biuret, guanidine, phenols, aromatic amines such as aniline, for instance, ordinary phenols and sulphonamides for instance p-toluene sulphonamides.

The invention is not limited to the formation in the materials of condensation products of aldehydes but includes the formation in the materials by methods similar to those described in detail above, of other types of synthetic resin, e. g., condensation products or polymerisation products of unsaturated compounds such as vinyl esters and acrylic acid esters. Thus, vinyl acetate may be applied to the materials in solution in alcohol preferably with the addition of a little turpentine which accelerates the polymerisation, and after drying the materials may be heated to effect the desired condensation. Other solvents which can be used for such unsaturated substances include chlorinated hydrocarbons, e. g., chloroform or mixtures of chlorinated hydrocarbons with hydrocarbons.

The invention is of special importance in connection with the treatment of textile materials having a basis of cellulose acetate and has been described herein with reference to the treatment of such materials. The process of the invention is also applicable, however, to other materials including films, foils and ribbons, having a basis of organic esters or ethers of cellulose, for example organic esters such as cellulose formate, propionate, and butyrate, mixed organic and inorganic esters such as cellulose nitrate acetate, cellulose acetate propionate, cellulose acetate propionate butyrate and cellulose nitrate acetate propionate, simple ethers such as ethyl-, methyl-, propyl-, and benzyl-celluloses and ether esters such as ethyl cellulose acetate and oxy-ethyl cellulose acetate. The invention is not limited to the treatment of esters or ethers of any particular ether or ester content. Thus, in the case of organic esters of cellulose, the acidyl value may range from less than that corresponding to a mono-ester to that corresponding to a tri-ester. In the case of lower organic esters of cellulose, however, the most useful results have been obtained with esters of acidyl content ranging from 1 to 2½ acidyl groups per $C_6H_{10}O_5$ unit.

When the materials treated comprise derivatives of cellulose formed in the presence of sulphuric acid, as for instance when materials of cellulose acetate produced in the presence of sulphuric acid as a catalyst are treated, it is of advantage to reduce the content of combined sulphuric acid in the materials as much as possible. This may be done, for example, by a protracted treatment with dilute sulphuric acid followed by washing and neutralisation of the free acid.

One of the most useful applications of the process of the invention is in the treatment of fabrics of organic derivatives of cellulose. By such treatment the resistance of the fabrics to creasing may be greatly increased. Effects such as embossing produced by mechanical treatment may be rendered more permanent, the affinity of the fabrics for acid dyes may be increased and the resistance of the materials to water may also be increased. The effects produced may extend over the whole fabric or may be local, localisation of the effect being produced for example by localising the polymerisation or condensation. Similar effects may be produced on films, ribbons and yarns. Thus, for example, crimped effects in yarns may be rendered more permanent by the treatment of the invention and the invention includes effecting the polymerisation after or in the course of a process designed to produce crimped threads for example by imparting false twist to the running threads, or during a process for producing crinkled ribbons or films.

Having described our invention, what we desire to secure by Letters Patent is:

1. Process for increasing the resiliency of filaments, yarns, fabrics, films and like materials having a basis of organic derivative of cellulose comprising causing the material to absorb from non-aqueous solution in methanol an intermediate water-soluble condensation product of urea and formaldehyde made by heating the components in a slightly alkaline solution of methanol, rendering the solution slightly acid, allowing it to stand and further acidifying with a mineral acid, the solution being maintained substantially anhydrous throughout, drying the material at ordinary temperatures after absorption of the intermediate compound and finally heating it to form from said intermediate compound a water-insoluble synthetic resin in the material.

2. Process for increasing the resiliency of filaments, yarns, fabrics, films and like materials having a basis of organic derivative of cellulose, which comprises causing the material to absorb from non-aqueous solution in a liquid having a swelling action on the material, an intermediate condensation product of synthetic resin components and converting said condensation product to a water-insoluble synthetic resin on the material under the influence of heat.

3. Process for increasing the resiliency of filaments, yarns, fabrics, films and like materials having a basis of organic derivative of cellulose, which comprises causing the material to absorb from non-aqueous solution in a liquid having a swelling action on the material, an intermediate condensation product of synthetic resin components, drying the material and converting said condensation product to a water-insoluble synthetic resin on the material under the influence of heat.

4. Process for increasing the resiliency of filaments, yarns, fabrics, films and like materials having a basis of organic derivative of cellulose, which comprises causing the material to absorb from non-aqueous solution in a liquid having a swelling action on the material, a water-soluble intermediate condensation product of synthetic resin components, drying the material and converting said condensation product to a water-insoluble synthetic resin on the material under the influence of heat.

5. Process for increasing the resiliency of filaments, yarns, fabrics, films and like materials having a basis of organic derivative of cellulose, which comprises causing the material to absorb from non-aqueous solution in a liquid having a swelling action on the material, a water-soluble intermediate condensation product of an aldehyde and a substance selected from the class consisting of urea, thiourea and dicyandiamide, drying the material and converting said condensation product to a water-insoluble synthetic resin on the material under the influence of heat.

6. Process for increasing the resiliency of filaments, yarns, fabrics, films and like materials having a basis of organic derivative of cellulose, which comprises causing the material to absorb from non-aqueous solution in a liquid having a swelling action on the material, a water-soluble intermediate condensation product of urea and formaldehyde, drying the material and converting said condensation product to a water-insoluble synthetic resin on the material under the influence of heat.

7. Process for increasing the resiliency of filaments, yarns, fabrics, films and like materials having a basis of organic derivative of cellulose, which comprises causing the material to absorb from non-aqueous solution in a liquid having a swelling action on the material, said liquid comprising a predominating proportion of an alcohol containing not more than two carbon atoms, a water-soluble intermediate condensation product of an aldehyde and a substance selected from the class consisting of urea, thiourea and dicyandiamide, drying the material and converting said condensation product to a water-insoluble synthetic resin on the material under the influence of heat.

8. Process for increasing the resiliency of filaments, yarns, fabrics, films and like materials having a basis of organic derivative of cellulose, which comprises causing the material to absorb from non-aqueous solution in a liquid having a swelling action on the material, said liquid comprising a predominating proportion of methanol, a water-soluble intermediate condensation product of an aldehyde and a substance selected from the class consisting of urea, thiourea and dicyandiamide, drying the material and converting said condensation product to a water-insoluble synthetic resin on the material under the influence of heat.

9. Process for increasing the resiliency of filaments, yarns, fabrics, films and like materials having a basis of cellulose acetate, which comprises causing the material to absorb from non-aqueous solution in a liquid having a swelling action on the material, an intermediate condensation product of synthetic resin components and converting said condensation product to a water-insoluble synthetic resin on the material under the influence of heat.

10. Process for increasing the resiliency of filaments, yarns, fabrics, films and like materials having a basis of cellulose acetate, which comprises causing the material to absorb from non-aqueous solution in a liquid having a swelling action on the material, a water-soluble intermediate condensation product of an aldehyde and a substance selected from the class consisting of urea, thiourea and dicyandiamide, drying the material and converting said condensation product to a synthetic resin on the material under the influence of heat.

11. Process for increasing the resiliency of filaments, yarns, fabrics, films and like materials having a basis of cellulose acetate, which comprises causing the material to absorb from non-aqueous solution in a liquid having a swelling action on the material, a water-soluble intermediate condensation product of an aldehyde and a substance selected from the class consisting of urea, thiourea and dicyandiamide, drying the material and converting said condensation product to a water-insoluble synthetic resin on the material under the influence of heat.

12. Process for increasing the resiliency of filaments, yarns, fabrics, films and like materials having a basis of cellulose acetate, which comprises causing the material to absorb from non-aqueous solution in a liquid having a swelling action on the material, said liquid comprising a predominating proportion of an alcohol containing not more than two carbon atoms, a water-soluble intermediate condensation product of an aldehyde and a substance selected from the class consisting of urea, thiourea and dicyandiamide, drying the material and converting said condensation product to a water-insoluble synthetic resin on the material under the influence of heat.

13. Process for increasing the resiliency of filaments, yarns, fabrics, films and like materials having a basic of cellulose acetate, which comprises causing the material to absorb from non-aqueous solution in methanol, an intermediate water-soluble condensation product of urea and formaldehyde made by heating the components in a slightly alkaline solution of methanol, rendering the solution slightly acid, allowing it to stand and further acidifying with a mineral acid, the solution being maintained substantially anhydrous throughout, drying the material at ordinary temperatures after absorption of the intermediate compound and finally heating it to form from said intermediate compound a water-insoluble synthetic resin in the material.

14. Process for increasing the resiliency of filaments, yarns, fabrics, films and like materials having a basic of organic derivative of cellulose, which comprises causing the material to absorb from non-aqueous solution in methanol, an intermediate water-soluble condensation product of urea and formaldehyde made by heating the components in a solution of methanol made slightly alkaline by the addition of anhydrous caustic potash, rendering the solution slightly acid by the addition first of acetic anhydride and then of concentrated sulphuric acid, allowing it to stand and further acidifying with a mineral acid, the solution being maintained substantially anhydrous throughout, drying the material at ordinary temperatures after absorption of the intermediate compound and finally heating it to form from said intermediate compound a water-insoluble synthetic resin in the material.

15. Process for increasing the resiliency of filaments, yarns, fabrics, films and like materials having a basis of cellulose acetate, which comprises causing the material to absorb from non-aqueous solution in methanol, an intermediate water-soluble condensation product of urea and formaldehyde made by heating the components in a solution of methanol made slightly alkaline by the addition of anhydrous caustic potash, rendering the solution slightly acid by the addition first of acetic anhydride and then of concentrated sulphuric acid, allowing it to stand and further acidifying with a mineral acid, the solution being maintained substantially anhydrous throughout, drying the material at ordinary temperatures after absorption of the intermediate compound and finally heating it to form from said intermediate compound a water-insoluble synthetic resin in the material.

HENRY DREYFUS.
DONALD FINLAYSON.
RICHARD GILBERT PERRY.